United States Patent
Jamison et al.

(10) Patent No.: US 6,942,271 B1
(45) Date of Patent: Sep. 13, 2005

(54) TRUCK BED STEP APPARATUS

(76) Inventors: Jason D. Jamison, P.O. Box 226, Kearney, MO (US) 64060; Todd D. Stowe, P.O. Box 226, Kearney, MO (US) 64060

( * ) Notice: Subject to any disclaimer, the term of this patent is extended or adjusted under 35 U.S.C. 154(b) by 0 days.

(21) Appl. No.: 10/899,405

(22) Filed: Jul. 27, 2004

(51) Int. Cl.⁷ .......................................... B62D 33/023
(52) U.S. Cl. ........................... 296/61; 14/71.1; 414/537
(58) Field of Search .............................. 296/61, 62, 50, 296/57.1; 414/537; 14/71.1, 71.5

(56) References Cited

U.S. PATENT DOCUMENTS

| | | | |
|---|---|---|---|
| 3,713,556 A * | 1/1973 | Tredray | 414/608 |
| 4,571,144 A * | 2/1986 | Guidry et al. | 414/537 |
| 4,757,876 A * | 7/1988 | Peacock | 182/95 |
| 4,848,821 A | 7/1989 | Llewellyn | |
| 5,028,063 A | 7/1991 | Andrews | |
| 5,205,603 A | 4/1993 | Burdette, Jr. | |
| D359,134 S | 6/1995 | Toews | |
| 5,540,474 A * | 7/1996 | Holland | 296/61 |
| 5,617,930 A | 4/1997 | Elia | |
| 5,791,717 A * | 8/1998 | Reich et al. | 296/61 |
| 6,102,645 A * | 8/2000 | Kooima et al. | 414/537 |
| 6,116,378 A | 9/2000 | Barrow | |
| 6,270,139 B1 | 8/2001 | Simpson | |
| 6,447,040 B1 * | 9/2002 | Young, Sr. | 296/61 |
| 6,634,848 B2 * | 10/2003 | Henderson | 414/537 |
| 2002/0098071 A1 * | 7/2002 | Henderson | 414/537 |

* cited by examiner

Primary Examiner—Patricia L. Engle

(57) ABSTRACT

A truck bed step apparatus includes a ladder assembly with a pair of side rails and a plurality of steps that are attached to and extend between the side rails. The side rails are each divided into a plurality of segments such that a plurality of ladder sections are defined. The sections are hingedly coupled together so that each of the sections may be selectively positioned in an extended position linearly aligned with an adjacent one of the sections or in a stored position folded onto an adjacent one of the sections. A bracket assembly is hingedly coupled to first ends of each of the side rails. The bracket assembly is removably attached to an inner surface of a tailgate. The side rails are stacked on the inner surface when the sections are in the stored position.

6 Claims, 6 Drawing Sheets

TRUCK BED STEP APPARATUS

BACKGROUND OF THE INVENTION

1. Field of the Invention

The present invention relates to truck step devices and more particularly pertains to a new truck step device for providing a steps that can be extended from a pickup bed tailgate to a ground surface.

2. Description of the Prior Art

The use of truck step devices is known in the prior art. U.S. Pat. No. 4,848,821 describes a two-stepped device that allows for a lift into a pick-up truck bed. Another type of truck step device is U.S. Pat. No. 5,205,603 having a pair of ladder portions slidably coupled together and slidably coupled to a tailgate. The ability to slide the device along the tailgate aids in the storage of the device. Another similar device is U.S. Pat. No. 5,028,063 that includes a single step which may be folded outwardly from a tailgate.

While these devices fulfill their respective, particular objectives and requirements, the need remains for a device that includes a ladder having multiple sections hingedly coupled together so that the ladder may be extended from a tailgate to a ground surface and which allows for storage of the ladder by folding the ladder up against the tailgate. The device should also include a locking system for locking the ladder in a folded position against the tailgate.

SUMMARY OF THE INVENTION

The present invention meets the needs presented above by generally comprising a ladder assembly including a pair of side rails and a plurality of steps that are attached to and extend between the side rails. Each of the side rails includes a first end and a second end. The side rails are each divided into a plurality of segments such that a plurality of ladder sections are defined. The sections are hingedly coupled together so that each of the sections may be selectively positioned in an extended position linearly aligned with an adjacent one of the sections or in a stored position folded onto an adjacent one of the sections. A bracket assembly is hingedly coupled to the first ends of each of the side rails. The bracket assembly is removably attached to the inner surface of the tailgate. The side rails are stacked on the inner surface when the sections are in the stored position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
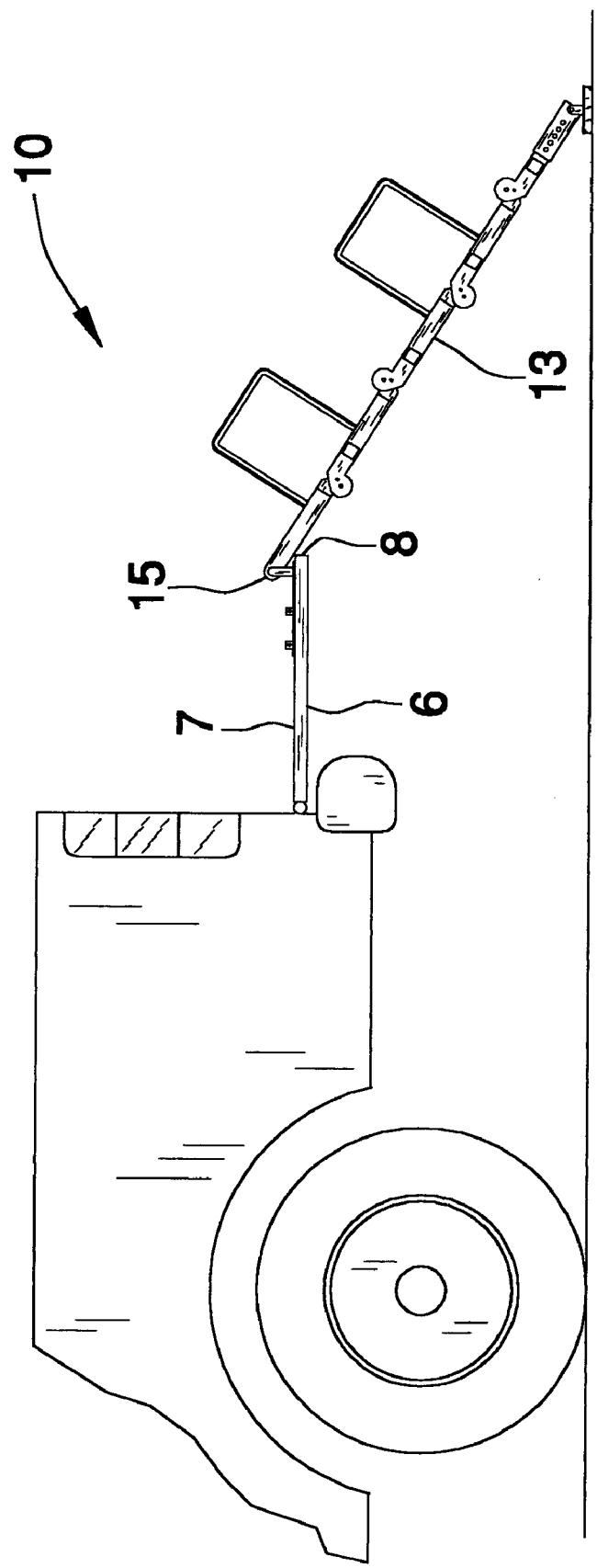
FIG. 1 is a side view of a truck bed step apparatus according to the present invention.

With reference now to the drawings, and in particular to FIGS. 1 through 7 thereof, a new truck step device embodying the principles and concepts of the present invention and generally designated by the reference numeral 10 will be described.

As best illustrated in FIGS. 1 through 7, the truck bed step apparatus 10 generally comprises a ladder assembly 12 that includes a pair of side rails 13 and a plurality of steps 14 that are attached to and extend between the side rails 13. Each of the side rails 13 includes a first end 15 and a second end 16. Each of the side rails 13 is divided into a plurality of segments 17 such that a plurality of ladder sections 18 are defined. The sections 18 are hingedly coupled together so that each of the sections 18 may be selectively positioned in an extended position linearly aligned with an adjacent one of the sections 18 or in a stored position folded onto an adjacent one of the sections 18. The sections 18 preferably include at least three and no more than six sections 18 each having a length generally between 12 inches and 24 inches. The total length of the ladder assembly 12 when all of the sections are in the extended position is preferably between 4 feet and 6 feet.

Each of a plurality of locking members 19 is attached to one of the sections 18. Each of the locking members 19 is adapted for selectively locking the sections 18 in the extended position. The locking members 19 are preferably outwardly biased nubs that are positioned at junctures of adjacent ones of the sections 18. The nubs, or locking members 19, are extended through openings of the adjacent sections 18 when the sections 18 are in a linear orientation so that the sections 18 are locked in the linear orientation. The nubs 19 may be depressed to release the sections 18 from each other so that the sections 18 may be may be placed in the stored position.

Figure 2:
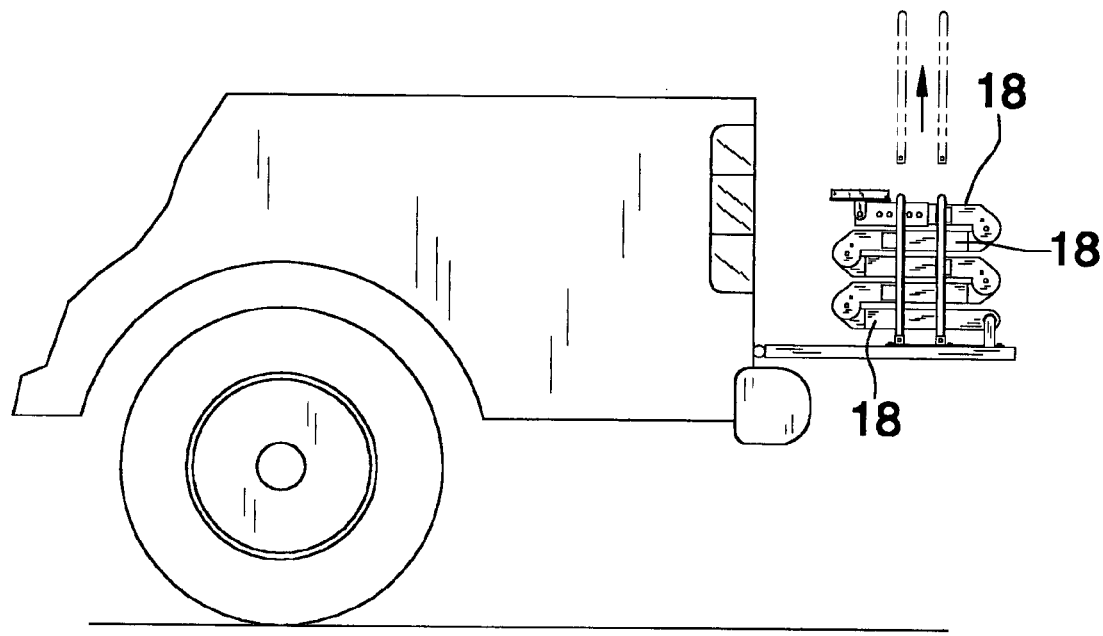
FIG. 2 is a side view of the present invention.

A bracket assembly 20 is hingedly coupled to the first ends 15 of each of the side rails 13. The bracket assembly 20 is removably attached to an inner surface 7 of a tailgate 6. The sections 18 of the side rails 13 are stacked on the inner surface, as shown in FIG. 2, when the sections 18 are in the stored position. The bracket assembly 20 includes a pair of elongated panels 22. Each of the panels 22 has an upper surface 24, a bottom surface 25, a front end 26 and a back end 27. Each of the elongated panels 22 may be removably attached to the inner surface 7 such that the bottom surface 25 abuts the inner surface 7 and each of the front ends 26 are positioned adjacent to and directed toward an upper edge 8 of the tailgate 6. The sections 18 are positioned between the elongated panels 22 when each of the sections 18 is positioned in the stored position for reasons that will become clear below. A rod 28 is attached to and extends between the panels 22. This is accomplished with a pair of side walls 29, each being mounted on one of the panels 22. The rod 28 extends between and into the side walls 29. The rod 28 is positioned on the upper surfaces 24 and is preferably adjacent to the front ends 26 of the panels 22. The rod 28 extends through each of the side rails 13 adjacent to the first ends 15. The side rails 13 are rotatable with respect to the rod 28 so that the rod 28 acts as a hinge between the side rails 13 and the plates 22. Ball bearings 30 may be mounted at a juncture of the rod 28 and side rails 13 to enhance the rotating ability of the side rails 13 with respect to the rod 28.

At least one handrail 32 has a pair of legs 33 and a central portion 35 extending between the legs 33 such that the handrail is generally U-shaped. Each of the legs 33 has a free end 34. At least one of the side rails 13 has a plurality of wells 36 therein. The wells 36 are positioned in pairs of wells 36 wherein each of the wells 36 in a pair of wells is spaced from each other a distance equal to the distance between the free ends 34 of the legs 33. The free ends 34 are removably extendable into wells 36 when the sections are in extended position so that the legs 33 generally extend upwardly from the wells as shown in FIG. 1. Preferably there are included a pair of handrails 32 and at least two pairs of wells 36. Also, the panels 22 of the bracket assembly 20 are spaced apart from each other a distance so that each of the free ends 34 of the legs 33 may simultaneously abut one of the panels 22.

Each of at least two couplers 37 is attached to one of the upper surfaces 24 of the panels 22 such that each of the panels 22 has at least one coupler 37 attached thereto. The couplers 37 are adapted for selectively attaching one of free ends 34 of the legs 33 to a respective one of the panels 22 so that the central portion 35 extends over the sections 18 when the sections 18 are in the stored position. If two handrails 32 are utilized, four couplers 37 will be used. The couplers 37 preferably include female couplers adapted for receiving the free ends 34. Removable pins 39 may be extended through corresponding apertures 38 in the couplers 37 and the legs 33 of the handrails 32.

Each of a pair of tubular members 50 each has an open end 51 and a closed end 52. Each of the second ends 16 of the side rails 13 extends into one of the open ends 51. The closed ends 52 may be selectively moved away from or closer to an associated one of the second ends 16 such that a length of each of the side rails 13 may be altered. The tubular members 50 may be locked with respect to the side rails 13 with securing members 55. Each of the tubular members 50 has an opening 53 extending therethrough that may be aligned with one of a corresponding plurality of aligned openings 54 in each of the side rails 13 adjacent to the second ends 16.

Each of a pair of foot pads 60 has a top side 61 and a bottom side 62. Each of the top sides 61 is hingedly coupled to one of the closed ends 52 so that they may pivot with respect to the tubular members 50. Each of the bottom sides 62 is preferably comprised of a conventional non-slip surface.

Figure 3:
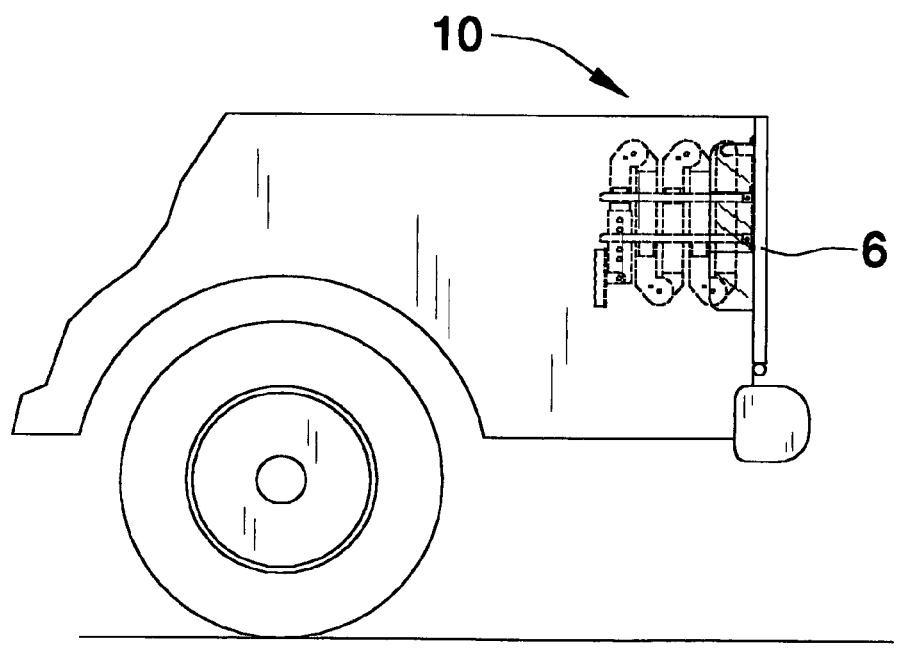
FIG. 3 is a side view of the present invention.
Figure 4:
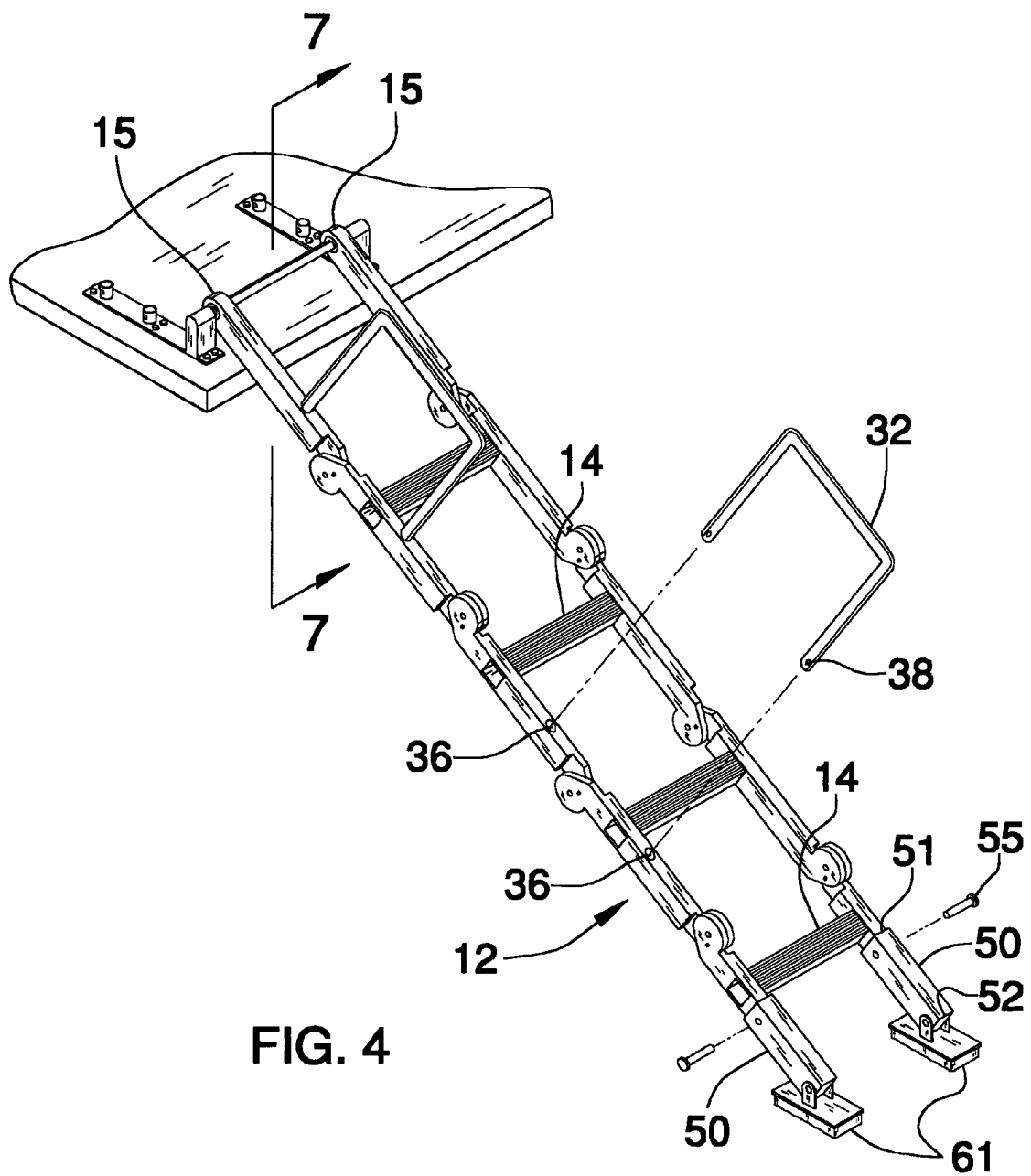
FIG. 4 is a perspective view of the present invention.
Figure 5:
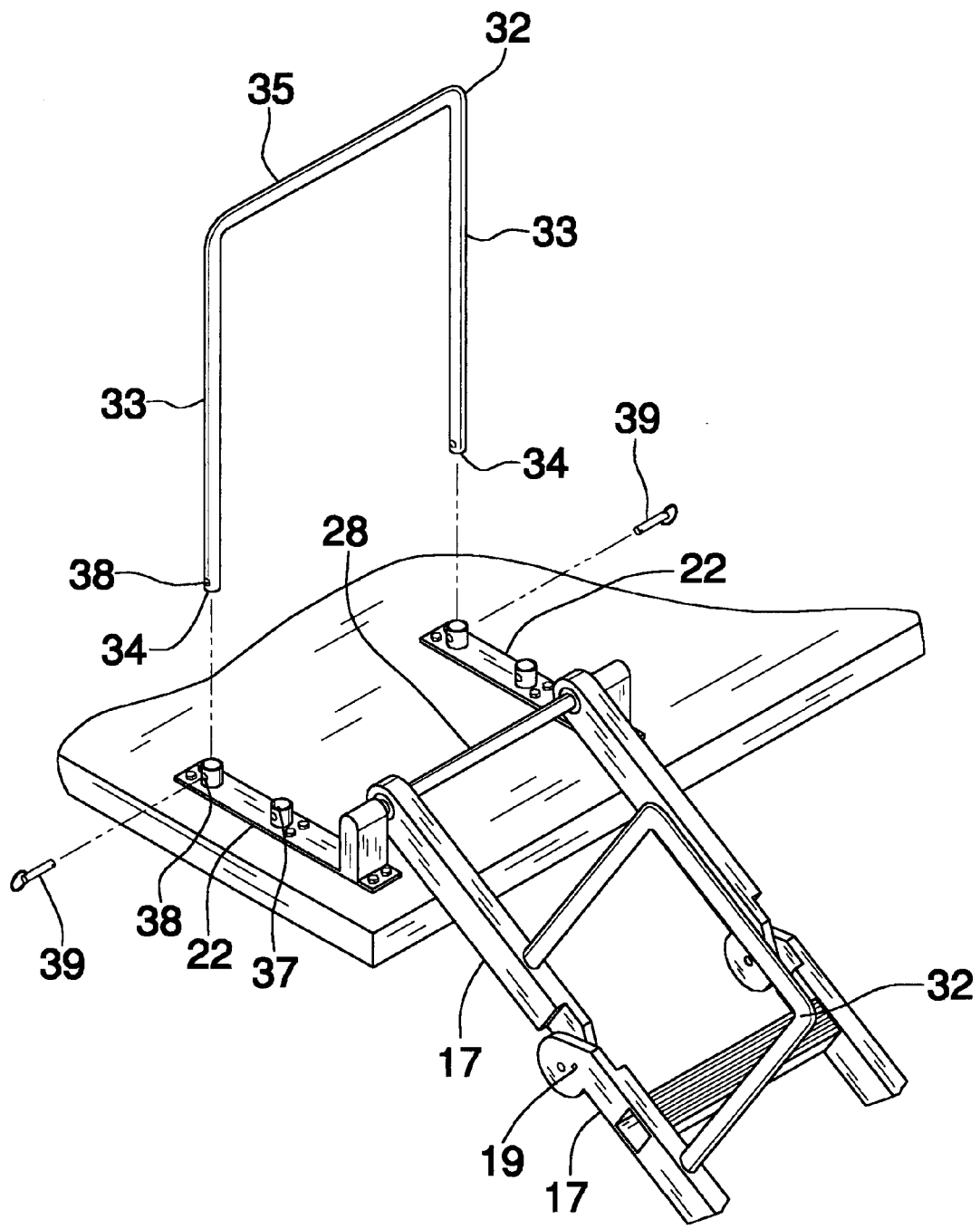
FIG. 5 is a perspective view of the present invention.
Figure 6:
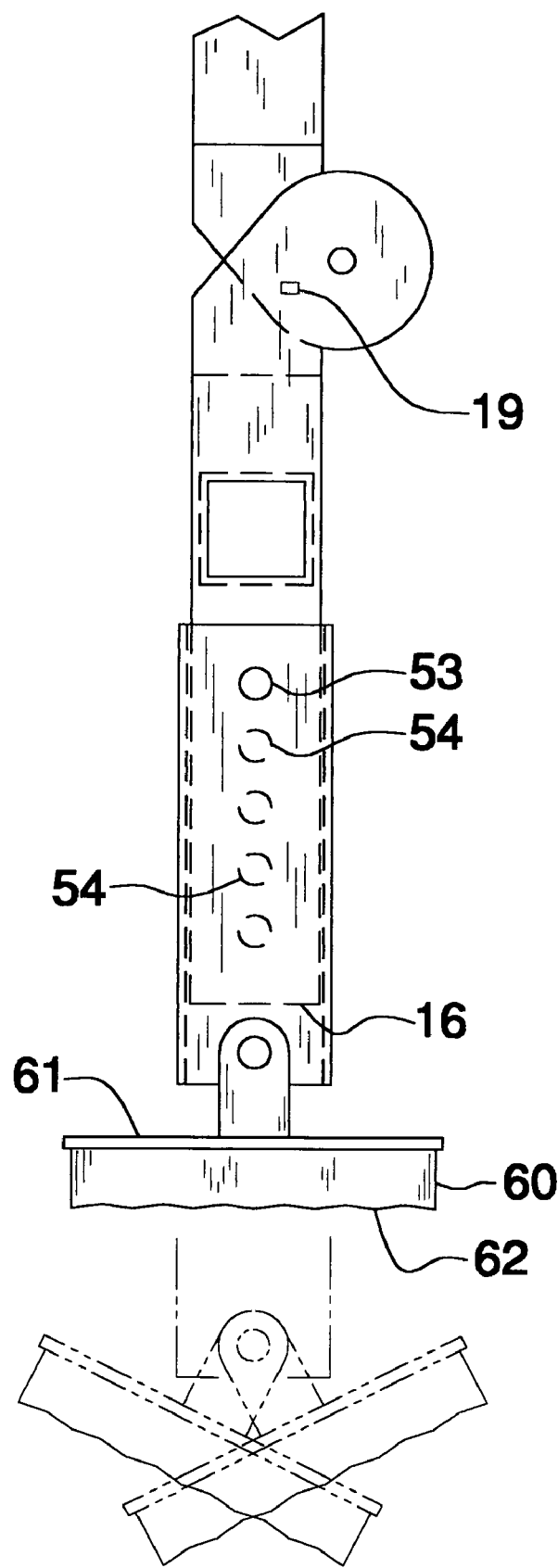
FIG. 6 is a side view of a tubular member and foot of the present invention.
Figure 7:
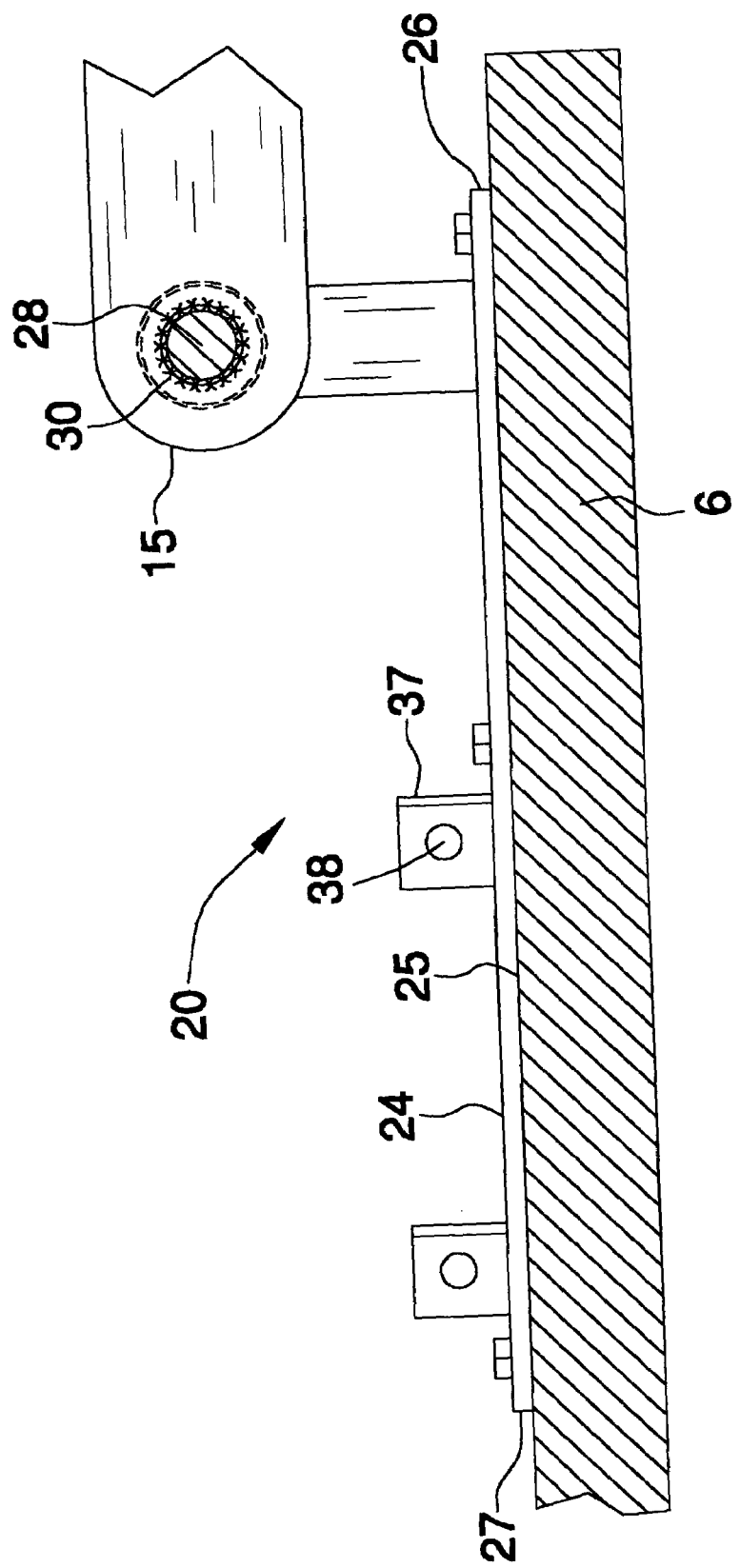
FIG. 7 is a cross-sectional view taken along line 7—7 of FIG. 4 of the present invention.

In use, the ladder assembly 12 may be positioned in the extended position as shown in FIG. 4 so that the ladder assembly extends from the tailgate 6 to a ground surface. This provides a plurality of walking steps for a person to easily get into the back of the pick-up truck. The handrails 32 may be inserted to provide additional balance for the user of the apparatus 10. When in the stored position, the sections 18 are stacked on top of each other against the tailgate 6. The handrails 32 are attached to the couplers 37 so that the handrails 32 act as a locking system for locking the sections 18 in the closed position as shown in FIG. 3. This allows a person to close the tailgate 6 without removing the apparatus 10 from the tailgate 6.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A step apparatus being selectively attached to and extended outwardly away from an inner surface of a tailgate, said apparatus comprising:

a ladder assembly including a pair of side rails and a plurality of steps being attached to and extending between said side rails, each of said side rails including a first end and a second end, each of said side rails being divided into a plurality of segments such that a plurality of ladder sections are defined, said sections being hingedly coupled together such that each of said sections may be selectively positioned in an extended position linearly aligned with an adjacent one of said sections or in a stored position folded onto an adjacent one of said sections, said sections including at least three sections;

a bracket assembly being hingedly coupled to said first ends of each of said side rails, said bracket assembly being removably attached to the inner surface of the tailgate, wherein sections of said side rails are stacked on said inner surface when said sections are in said stored position;

at least one handrail having a pair of legs and a central portion extending between said legs such that said handrail is generally U-shaped, each of said legs having a free end, at least one of said side rails having a plurality of wells therein, said free ends being removably extendable into wells when said sections are in extended position such that said legs generally extend upwardly from said wells; and at least two couplers, each of said couplers being attached to said bracket assembly, each of said couplers being adapted for selectively attaching one of said free ends of said legs to said bracket assembly such that said central portion extends over said sections when said sections are in said stored position.

2. The apparatus according to claim 1, further including a plurality of locking members, each of said locking members being attached to one of said sections, each of said locking members being adapted for selectively locking said sections in said extended position.

3. The apparatus according to claim 1, wherein said bracket assembly includes a pair of elongated panels, each of said panels having an upper surface, a bottom surface, a front end and a back end, wherein each of said elongated panels may be removably attached to the inner surface such that said bottom surface abuts said inner surface and each of said front ends are positioned adjacent to and directed toward an upper edge of the tailgate, wherein said sections are positioned between said elongated panels when each of said sections are positioned in said stored position, a rod being attached to and extending between said panels, said rod being positioned on said upper surfaces and adjacent to said front ends of said panels, said rod extending through said side rails and being positioned adjacent to said first ends.

4. The apparatus according to claim 1, further including a pair of tubular members each having an open end and a closed end, each of said second ends of said side rails extending into one of said open ends, wherein said closed ends may be selectively moved away from or closer to an associated one of said second ends such that a length of each of said side rails may be altered.

5. The apparatus according to claim 4, further including a pair of foot pads, each of said foot pads having a top side hingedly coupled to one of said closed ends.

6. A step apparatus being selectively attached to and extended outwardly away from an inner surface of a tailgate, said apparatus comprising:
- a ladder assembly including a pair of side rails and a plurality of steps being attached to and extending between said side rails, each of said side rails including a first end and a second end, each of said side rails being divided into a plurality of segments such that a plurality of ladder sections are defined, said sections being hingedly coupled together such that each of said sections may be selectively positioned in an extended position linearly aligned with an adjacent one of said sections or in a stored position folded onto an adjacent one of said sections;
- a plurality of locking members, each of said locking members being attached to one of said sections, each of said locking members being adapted for selectively locking said sections in said extended position;
- a bracket assembly being hingedly coupled to said first ends of each of said side rails, said bracket assembly being removably attached to the inner surface of the tailgate, wherein sections of said side rails are stacked on said inner surface when said sections are in said stored position, said bracket assembly including,
  - a pair of elongated panels, each of said panels having an upper surface, a bottom surface, a front end and a back end, wherein each of said elongated panels may be removably attached to the inner surface such that said bottom surface abuts said inner surface and each of said front ends are positioned adjacent to and directed toward an upper edge of the tailgate, wherein said sections are positioned between said elongated panels when each of said sections are positioned in said stored position;
  - a rod being attached to and extending between said panels, said rod being positioned on said upper surfaces and adjacent to said front ends of said panels, said rod extending through said side rails and being positioned adjacent to said first ends;
- at least one handrail having a pair of legs and a central portion extending between said legs such that said handrail is generally U-shaped, each of said legs having a free end, at least one of said side rails having a plurality of wells therein, said free ends being removably extendable into wells when said sections are in extended position such that said legs generally extend upwardly from said wells;
- at least two couplers, each of said couplers being attached to one of said upper surfaces of said panels such that each of said panels has at least one coupler attached thereto, each of said couplers being adapted for selectively attaching one of free ends of said legs to a respective one of said panels such that said central portion extends over said sections when said sections are in said stored position;
- a pair of tubular members each having an open end and a closed end, each of said second ends of said side rails extending into one of said open ends, wherein said closed ends may be selectively moved away from or closer to an associated one of said second ends such that a length of each of said side rails may be altered; and
- a pair of foot pads, each of said foot pads having a top side hingedly coupled to one of said closed ends.

* * * * *